A. W. STRAUB.
Car Wheel.
No. 52,089. 
Patented Jan. 16, 1866.
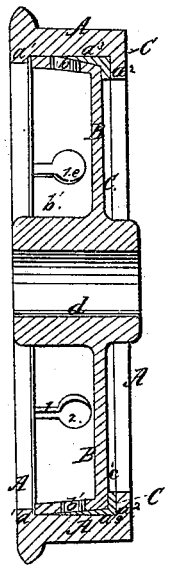
Witnesses:
Inventor:

UNITED STATES PATENT OFFICE.

A. W. STRAUB, OF PHILADELPHIA, PENNSYLVANIA.

IMPROVED WHEEL FOR RAILROAD-CARS.

Specification forming part of Letters Patent No. 52,089, dated January 16, 1866.

*To all whom it may concern:*

Be it known that I, AMBROSE W. STRAUB, of the city of Philadelphia, in the State of Pennsylvania, have invented a new and useful Improvement in Wheels for Railroad-Cars; and I do hereby declare that the following is a full, clear, and exact description of the construction and operation of the same, reference being had to the accompanying drawing, representing a diametrical section of the said improved wheel, and making a part of this specification, and to the letters of reference marked thereon.

My improvement relates to that class of car-wheels which have spring-seated rims or tires for the purpose of diminishing or overcoming the pounding effect which the rigidly-constructed wheels produce in rolling rapidly over any little unevenness or irregularity in the surface of the track-rails, and has for its object the production of a more simple, reliable, and durable wheel for the purpose.

My invention consists in the peculiar mode, hereinafter described and specified, of constructing and combining together the rim or tire and the web or center of a car-wheel, so as to produce the springiness required without the use of screws, bolts, or other like objectionable attachments to keep the parts together.

In the drawing, A is the rim or tire of the wheel, and B the web or center. The rim or tire A is in one piece of the metal, having two flanges, $a'$ $a^2$, projecting from its inner side, so as to produce a rectangular recess, $a^3$, around in the said inner side, substantially as shown in the drawing. The web or center B is also in one piece of the metal, and in this instance is in the form of a flat disk having the usual hub $d$ in its center. From the edge of this web or center B a flange, $b'$, projects inward, so as to form a broad, tapering, slightly convex boundary or rim thereon, substantially as shown in the drawing. The diameter of the said web B from the outside angle of its rim $b'$ is about an inch (more or less) shorter than the diameter of the annular recess $a^3$ in the tire A, while its diameter from the inner or free edge of its flange $b'$ is slightly longer than the diameter of the said recess $a^3$, and the width of the said flange $b$ is a little less than the width of the recess $a^3$ in the tire A. The smaller diameter of the center B corresponds with the diameter of the open space encircled by the flange $a'$ of the rim or tire A of the wheel.

The flange or rim $b'$ of the web or center B is intended to be forced into the recess $a^3$ of the rim or tire A by means of hydraulic or other pressure, the said flange $b'$ having several slots, $e$ $e$, cut in from its free edge, at regular distances apart from each other, for the purpose of allowing it to be sprung inward by the annular flange $a'$ while it is being forced through the space formed by the said encircling-flange $a'$, and afterward to spring outward toward its normal condition, so as to catch sufficiently under or behind the said flange $a'$ to keep it securely in place in the recess $a^3$, and also cause it to bear against the part of the bottom of the said recess which is around near the flange $a'$ of the tire A, as shown in the drawing.

The center B may be inserted by expanding the rim or tire A by heat, if preferred.

A flanged packing-ring, C, of vulcanized gum-elastic, occupies the space left between the flange $b'$ and the bottom and one side of the recess $a^3$, as shown in the drawing; and it will be understood that after the center B has been sprung into the tire A, as described, it will press against the bottom of the recess $a^3$, and also be in contact with the packing C, and consequently the rim or tire A and the web B will be held tightly together, as represented in the drawing, and thus whether the packing be inserted or not.

The object of the packing C is principally to fill the space it occupies so as to keep out dust or dirt; but at the same time it contributes somewhat to the springiness required in the wheel. It may therefore be dispensed with without seriously impairing the effectiveness required in the wheel.

Operation: When this wheel is in use, rolling rapidly on an even rail, the inner portion of the flange $b'$ supports the weight of the car without varying; but when any little unevenness or irregularity is encountered on the track-rail the web B springs enough on itself to break the objectionable pounding effect, the flange $b'$ rocking accordingly on its convex outer surface against the bottom of the recess in the tire A.

It will be seen that there are only two distinct metallic pieces or parts in this wheel—i. e., the rim or tire A and the web or center B—and that therefore neither bolts, nor screws, nor other like objectionable attachments are employed; that a sufficient degree of springiness will be afforded between the tire A and center B, whether the packing be used or not, to free the wheel from the objectionable rigidity that in the ordinary wheels causes the pounding which is so destructive to both the rails and the cars; and that it will be more durable in use than any of the wheels heretofore produced having spring-seated tires or rims.

I do not intend to confine myself in the construction of this wheel to the use of the vulcanized gum packing C, nor even to the use of any packing whatever; nor do I intend to confine myself to making the center B solid or continuous, as described and shown, as this part may be made in an open or skeleton form, if desired, without impairing its effectiveness; but, Having fully described my improvement and pointed out its utility, what I claim as new therein of my invention, and desire to secure by Letters Patent, is—

A car-wheel consisting of the rim or tire A and the web or center B, constructed and combined together substantially as and for the purpose described.

A. W. STRAUB.

Witnesses:
 BENJ. MORISON,
 JAS. WINSMORE.